(12) United States Patent
El Ferik et al.

(10) Patent No.: US 11,435,734 B2
(45) Date of Patent: Sep. 6, 2022

(54) APPARATUS AND METHOD FOR FAILURE DETECTION

(71) Applicants: KING FAHD UNIVERSITY OF PETROLEUM AND MINERALS, Dhahran (SA); Yokogawa Saudi Arabia Company, Al-Khobar (SA)

(72) Inventors: Sami El Ferik, Dhahran (SA); Ahmed A. Adeniran, Dhahran (SA); Muideen Adegoke, Dhahran (SA); Mustafa Alnaser, Al-Khobar (SA)

(73) Assignees: KING FAHD UNIVERSITY OF PETROLEUM AND MINERALS, Dhahran (SA); Yokogawa Saudi Arabia Company, Al-Khobar (SA)

( * ) Notice: Subject to any disclaimer, the term of this patent is extended or adjusted under 35 U.S.C. 154(b) by 667 days.

(21) Appl. No.: 16/502,421

(22) Filed: Jul. 3, 2019

(65) Prior Publication Data
US 2020/0302226 A1  Sep. 24, 2020

Related U.S. Application Data

(60) Provisional application No. 62/820,524, filed on Mar. 19, 2019.

(51) Int. Cl.
| | | |
|---|---|---|
| G05B 23/02 | (2006.01) | |
| G06K 9/62 | (2022.01) | |
| G06F 11/07 | (2006.01) | |

(52) U.S. Cl.
CPC ........ *G05B 23/0254* (2013.01); *G06F 11/079* (2013.01); *G06F 11/0778* (2013.01); *G06K 9/6223* (2013.01); *G06K 9/6293* (2013.01)

(58) Field of Classification Search
CPC .. G06K 9/6223; G06K 9/6293; G06K 9/6217; G05B 23/0254; G06F 11/0778; G06F 11/079; G06F 11/0751
See application file for complete search history.

(56) References Cited

U.S. PATENT DOCUMENTS

| | | | |
|---|---|---|---|
| 10,468,142 B1 * | 11/2019 | Abou Shousha | ...... G16H 50/20 |
| 2012/0185728 A1 | 7/2012 | Guo et al. | |

(Continued)

FOREIGN PATENT DOCUMENTS

| | | |
|---|---|---|
| CN | 105716844 A | 6/2016 |
| CN | 108869055 A | 11/2018 |
| KR | 10-1189697 B1 | 10/2012 |

OTHER PUBLICATIONS

Ling Ma, et al., "Fault Detection and Diagnosis for GTM UAV with Dual Unscented Kalman Filter", AIAA Guidance, Navigation, and Control Conference, Aug. 2-5, 2010, pp. 1-12.

(Continued)

*Primary Examiner* — Santosh R Poudel
(74) *Attorney, Agent, or Firm* — Oblon, McClelland, Maier & Neustadt, L.L.P.

(57) ABSTRACT

In a method for failure, detection, operational data from a plurality of components in a system are received. A bank of submodels is created based on the operational data. The bank of submodels corresponds to a normal mode and one or more faulty modes of the system and is valid in different operating regimes of the system. Each of the banks of submodels has a respective weight (validity) and a respective suboutput. An output of the system is a weighted sum of the suboutputs of the submodels. The operational data is therefore processed to generate a validity profile through a constrained Kalman Filter (KCF) based multimodel fault detection and diagnosis (FDD). Subsequently, the validity profile is output. The validity profile is indicative of an operation state of the system at a given time, and the operation state includes a normal state and a fault state.

11 Claims, 11 Drawing Sheets

(56) References Cited

U.S. PATENT DOCUMENTS

| | | | |
|---|---|---|---|
| 2012/0245747 A1* | 9/2012 | Kumar | F01K 13/02 700/288 |
| 2013/0013255 A1* | 1/2013 | Du | F01K 13/02 702/183 |
| 2019/0219994 A1* | 7/2019 | Yan | G05B 13/027 |

OTHER PUBLICATIONS

Yanyan Hu, et al., "Time-Varying Fault Diagnosis for Asynchronous Muitisensor Systems Based on Augmented IMM and Strong Tracking Filtering", Journal of Control Science and Engineering, 2018, pp. 1-8.

Sami El Ferik, et al., "Failure Detection of Control Actuators Using Constrained Kalman Filter Based Multimodels: An Experimental Study", 15$^{th}$ International Multi-Conference on Systems, Signals & Devices (SSD), Mar. 2018, pp. 1-6.

* cited by examiner

APPARATUS AND METHOD FOR FAILURE DETECTION

CROSS-REFERENCE TO RELATED APPLICATIONS

This application is based on, and claims the benefit of priority to, provisional application No. 62/820,524, filed Mar. 19, 2019, the entire contents of which are incorporated herein by reference.

STATEMENT OF ACKNOWLEDGEMENT

The support provided by King Fand University of Petroleum and Minerals (KFUPM) and Yokogawa YKSA through project No. SE002368 is acknowledged.

STATEMENT OF PRIOR DISCLOSURE BY AN INVENTOR

Failure detection through constrained Kalman filter based multimodel fault detection and diagnosis (FDD) were described in Sami El Ferik, Ahmed A. Adeniran, Muideen Adegoke, and Mustafa Al-Nasser, "Failure Detection of Control Actuators using Constrained Kalman Filter Based Multimodels An Experimental Study," 2018 15th International Multi-Conference on Systems, Signals & Devices (SSD)—incorporated herein by reference in its entirety.

BACKGROUND

Field of the Invention

The present disclosure is directed to a method and an apparatus for failure detection.

Description of the Related Art

Fault detection is a concern in many industrial applications. Several approaches have been used. One approach that is widely used is based on a single reference model that describes the expected nominal dynamic of a healthy system around a certain operating point. A system is considered healthy if its measured signals are around the nominal behavior, whereas a fault is triggered otherwise. The first challenging task of this approach is determining acceptable deviation margins. This approach may lead to the detection of false failures due to operational reasons such as a natural move from one operating region to another in the operating space, etc.

Recently, increasing demand for reliability, availability and safety in the operation of industrial systems have attracted significant research interest in fault detection and diagnosis (FDD). Petrochemical industries alone lose around 20 billion dollars every year due to abnormal event management (AEM). Hence, FDD as a main component of any AEM system is crucial for system performance, quality product, and safe operation. As a consequence, several approaches to FDD have been reported in the literature (See V. Venkatasubramanian, R. Rengaswamy, K. Yin, and S. N. Kavuri, "A review of process fault detection and diagnosis: Part i: Quantitative model-based methods," *Computers & chemical engineering*, vol. 27, no. 3, pp. 293-311, 2003, incorporated herein by reference in its entirety).

Several FDD schemes that employ a bank of fault diagnosers have been described. The fault diagnosers are either in the form of multiple observers (See B. Marx, D. Koenig, and J. Ragot, "Design of observers for takagi-sugeno descriptor systems with unknown inputs and application to fault diagnosis," *IET Control Theory Applications*, vol. 1, no. 5, pp. 1487-1495, September 2007; R. Razavi-Far and M. Kinnaert, "A multiple observers and dynamic weighting ensembles scheme for diagnosing new class faults in wind turbines," *Control Engineering Practice*, vol. 21, no. 9, pp. 1165-1177, 2013, each incorporated herein by reference in their entirety) or multiple models (see T. E. Menke and P. S. Maybeck, "Sensor/actuator failure detection in the vista f-16 by multiple model adaptive estimation," *IEEE Transactions on Aerospace and Electronic Systems*, vol. 31, no. 4, pp. 1218-1229, October 1995; K. Patan and T. Parisini, "Identification of neural dynamic models for fault detection and isolation: the case of a real sugar evaporation process," *Journal of Process Control*, vol. 15, no. 1, pp. 67-79, 2005; S. Simani, "Residual generator fuzzy identification for automotive diesel engine fault diagnosis," *International Journal of Applied Mathematics and Computer Science*, vol. 23, no. 2, pp. 419-438, 2013; S. Simani and R. J. Patton, "Fault diagnosis of an industrial gas turbine prototype using a system identification approach," *Control Engineering Practice*, vol. 16, no. 7, pp. 769-786, 2008; N. Meskin, E. Naderi, and K. Khorasani, "A multiple model-based approach for fault diagnosis of jet engines," *IEEE Transaction on Control Systems Technology*, vol. 21, pp. 254-262, 2013; Z. S. Vanini, K. Khorasani, and N. Meskin, "Fault detection and isolation of a dual spool gas turbine engine using dynamic neural networks and multiple model approach," *Information Sciences*, vol. 259, no. 0, pp. 234-251, 2014; V. Fuvesi and E. Kovacs, "Neural network multimodel based method of fault diagnostics of actuators," in *Power Electronics, Electrical Drives, Automation and Motion (SPEEDAM)*, 2014 International Symposium on, June 2014, pp. 204-209; and S. Zhao, B. Huang, and F. Liu, "Fault detection and diagnosis of multiple-model systems with mismodeled transition probabilities," *IEEE Transactions on Industrial Electronics*, vol. 62, no. 8, pp. 5063-5071, August 2015, each incorporated herein by reference in their entirety).

In the present disclosure, a multimodel FDD system including a bank of submodels and a constrained Kalman filter (CKF) based supervisor is proposed for detection and isolation of faults. Unlike other MM-FDD methods, such as those in Menke et al. (see T. E. Menke and P. S. Maybeck, "Sensor/actuator failure detection in the vista f-16 by multiple model adaptive estimation," *IEEE Transactions on Aerospace and Electronic Systems*, vol. 31, no. 4, pp. 1218-1229, October 1995, incorporated herein by reference in its entirety), Meskin et al. (see N. Meskin, E. Naderi, and K. Khorasani, "A multiple model-based approach for fault diagnosis of jet engines," *IEEE Transaction on Control Systems Technology*, vol. 21, pp. 254-262, 2013, incorporated herein by reference in its entirety), and Zhao et al. (see S. Zhao, B. Huang, and F. Liu, "Fault detection and diagnosis of multiple-model systems with mismodeled transition probabilities," *IEEE Transactions on Industrial Electronics*, vol. 62, no. 8, pp. 5063-5071, August 2015, incorporated herein by reference in its entirety), the proposed CKF supervisor based multimodel FDD approach is independent of the type of models in the model bank. Hence analytical models, data-driven models or combination of both can be used to generate a bank of models corresponding to the healthy and faulty scenarios. In the absence of analytical models of the diagnosed system, function network (FN) data-driven model is proposed. The CKF supervisor also has the advantages of taking into consideration the modeling error and measurement noise that is usually encountered in practice and eliminating the difficult tasks of assigning threshold to isolate fault.

In the present disclosure, a MM-based FDD with CKF supervisor is provided. In addition, examples, simulations and experimental setups are provided. Embodiments of the experimental setup and the implementation of the proposed FDD approach are included in a level control system.

It is one object of the present disclosure to provide a multimodel based fault detection, diagnosis, and isolation method, system and apparatus. The proposed approach has several important features. A combination of several local model types can be used. The approach can be applied to several types of control actuators failures. Experimental application of the proposed approach to control valve failure demonstrates the practicality of the proposed method.

SUMMARY

According to a first aspect of the present disclosure, a method, system and an apparatus for failure detection in a system are provided. In the disclosed method that is operated by the disclosed apparatus, operational data from a plurality of components in the system are received. A bank of submodels is created based on the operational data. The bank of submodels corresponds to a normal mode and a plurality of faulty modes of the system and is valid in different operating regimes of the system. Each of the bank of submodels has a respective weight (validity) and a respective suboutput. An output of the system is a weighted sum of the suboutputs of the submodels.

The operational data is therefore processed to generate a validity profile through a constrained Kalman Filter (CKF) based multimodel fault detection and diagnosis (FDD). Subsequently, the validity profile is output. The validity profile is indicative of an operation state of the system at a given time, and the operation state includes a normal state and a fault state.

In some embodiments, the bank of submodels includes at least one of an analytical submodel, a data-driven submodel, and a function network (FN) data-driven model.

In some embodiments, the bank of submodels includes a plurality of submodels $\mathcal{M}_i$ where i=1, 2, ... M, $\mathcal{M}_1$ corresponds to the normal mode, and $\mathcal{M}_2$ to $\mathcal{M}_M$ correspond to the faulty modes of the system. An output y(k) of the system is equal to $\Sigma_{i=1}^{M} y_i(k)\phi(k)+v(k)$, where $y_i$ is an output of the submodel $\mathcal{M}_i$, i=1, 2, ... M, v represents a modeling and measurement noise, k is a time moment, and $\phi_i$, i=1, 2, ... M is the weight or validity of the submodel $\mathcal{M}_i$.

In some embodiments, the validity $\phi_i$ of the submodel $\mathcal{M}_i$ further includes an equality constraint that is $\Sigma_{i=1}^{M}\phi_i(k)=1$, and an inequality constraint that is $0 \leq \phi_i \leq 1$.

In some embodiments, the CFK based FDD includes solving the equality constraint of the validity $\Phi(k)$ via a projection technique to obtain a updated equality constrained estimate $\hat{\Phi}^*(k)$, where the $\Phi(k)$ is a vector of the validity $\phi_i$ that is equal to $[\phi_1(k), \phi_2(k), \ldots, \phi_M(k)]^T$. The CFK based FDD also includes performing a truncation operation on the updated equality constrained estimate $\hat{\Phi}^*(k)$ to obtain a truncated estimate $\hat{\phi}_i^{}(k)$, where $\hat{\phi}_i^{}(k)=0$, if $\hat{\phi}_i^{}(k)<0$. Further, the CFK based FDD performs a normalization operation on the truncated estimate $\hat{\phi}_i^{}(k)$ to obtain a final estimate $\hat{\phi}_i^{*}(k)$, where $$\hat{\phi}_i^{*}(k) = \frac{\hat{\phi}_i^{}(k)}{\sum_{i=1}^{M}\hat{\phi}_i^{}(k)}.$$

In some embodiments, an unconstrained estimate $\hat{\Phi}(k)$ of the validity $\Phi(k)$ is projected onto a constraint space by minimizing $$\underset{\Phi}{\text{minimize}}\, E[(\Phi(k)-\hat{\Phi}(k))^T W(\Phi(k)-\hat{\Phi}(k))],$$

where $\beta\Phi(k)=1$, $\beta$ is a row vector of $[1, 1, \ldots, 1, 1]$, $\Phi(k)$ is the vector of $[\phi_1(k), \phi_2(k), \ldots, \phi_M(k)]^T$, and W is a positive define matrix. The updated equality constrained estimate $\hat{\Phi}^*(k)$ is subsequently obtained by solving $$\underset{\Phi}{\text{minimize}}\, E[(\Phi(k)-\hat{\Phi}(k))^T W(\Phi(k)-\hat{\Phi}(k))].$$

In some embodiments, the updated equality constrained estimate $\hat{\Phi}^*(k)$ is equal to $\hat{\Phi}(k)+K^*(k)[1-\beta\hat{\Phi}(k)]$, where $K^*(k)=W^{-1}\beta^T[R+\beta W^{-1}\beta^T]^{-1}$, $P^*(k)=[1-K^*(k)\beta]W^{-1}+Q$, R is a covariance of v(k), and Q is a covariance of an artificial noise w(k) that is applied as $\hat{\Phi}(k+1)=\hat{\Phi}(k)+w(k)$.

In some embodiments, the unconstrained estimate $\hat{\Phi}(k)$ is obtained by using a standard Kalman filter solution so that $\hat{\Phi}(k)=\hat{\Phi}^-(k)+K(k)[y(k)-\bar{y}(k)\hat{\Phi}^-(k)]$, where $\hat{\Phi}^-(k)=\hat{\Phi}^-{}^{-1}(k-1)$, $P^-(k)=P^-(k-1)+Q(k-1)$, $K(k)=P^-(k)\bar{y}^T(k)[\bar{y}(k)^P-(k)\bar{y}^T(k)+R(k)]^{-1}$, $P(k)=[I-K(k)\bar{y}(k)]P^-(k)$, and $\bar{y}=[y_1, y_2, \ldots, y_M]$.

In some embodiments, in the disclosed method, a failure of the system is captured based on a prediction of the validity. A residual life of the system is estimated based on the prediction of the validity, and a next failure time is estimated based on the prediction of the validity.

In some embodiments, operational data of the system is categorized through at least one of a K-means clustering and a C-means clustering to build the bank of submodels.

According to another aspect, a non-transitory computer readable storage medium is disclosed. The non-transitory computer readable storage medium stores instructions which when executed by at least one processor cause the at least one processor to perform any of the methods for failure detection in a system mentioned above.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
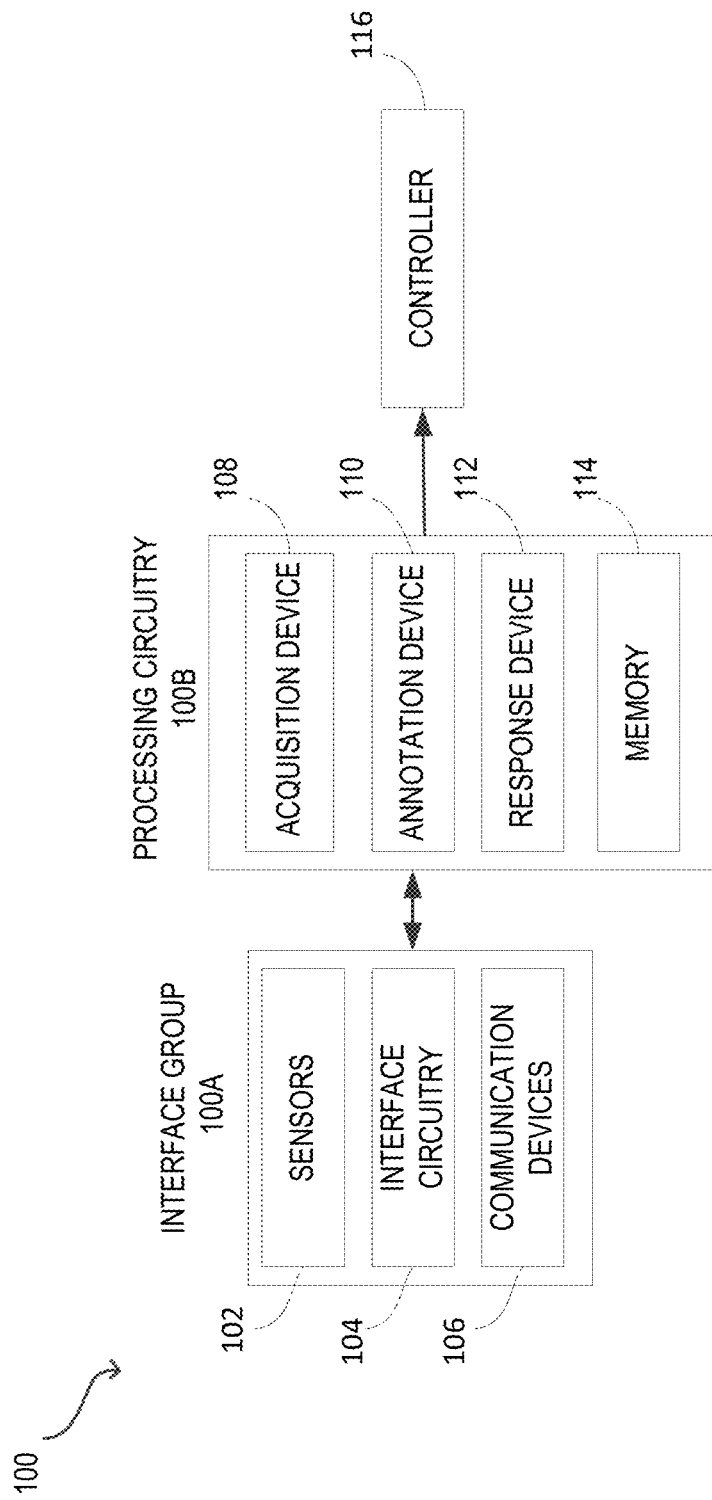
FIG. 1 is a schematic diagram of an exemplary apparatus for failure detection of a system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features may be in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

In the disclosure, a Constrained Kalman Filter (CKF) based multimodel FDD and its implementation as a method, system and apparatus is described.

For a given system, let y denote the output of a given system to be diagnosed, and $y_i$ is an suboutput of a submodel $\mathcal{M}_i$, $i=1, 2, \ldots M$, where the submodel $\mathcal{M}_1$ corresponds to a healthy (normal) mode of the system, and $\mathcal{M}_i$, $i=2, 3 \ldots M$ correspond to other fault modes of interest that can be experienced by the system. In accordance with the multimodel identification framework (see T. Johansen and B. Foss, "Operating regime based process modeling and identification," *Computers and Chemical Engineering*, vol. 21, pp. 159-176, 1997—incorporated herein by reference in its entirety), the diagnosed system can be represented by a weighted sum of the output of the submodels:

$$y(k)=\Sigma_{i=1}^{M} y_i(k)\phi_j(k)+v(k) \quad (1)$$

where y(k) is the output of the system, v represents a modeling and measurement noise and $\phi_i$, $i=1, 2, \ldots$ M is a weight of the submodel $\mathcal{M}_i$, called the validity, and k is a time moment. To enhance the interpretation of the validity of the submodels, the validity can satisfy a convexity property (See R. Orjuela, D. Maquin, and J. Ragot, "Nonlinear system identification using uncoupled state multiple model approach," in *Workshop on Advanced Control and Diagnosis*, ACD'2006, 2006, incorporated herein by reference in its entirety):

$$\Sigma_{i=1}^{M}\phi_i(k)=1 \ \forall k \quad (2)$$

$$0\leq\phi_i\leq 1 \ \forall k, \ \forall i \in 1, \ldots, M. \quad (3)$$

Equation (2) is an equality constraint of the validity of the submodels, and Equation (3) presents an inequality constraint of the validity of the submodels.

The validity (weight) of the submodel, $\phi$, describes contributions of each of the submodels $\mathcal{M}_i$ to the output of the system. Hence, an estimation of the validity for each of the submodels is crucial in the proposed FDD scheme as the estimate of the validity determines a state of the system at any given time.

The validity, $\phi_i$, $i=1, 2, \ldots$ M, can be estimated based on Equation (1) by using a CKF based multimodel FDD in following sections.

The multimodel representation of the system mentioned above can be represented in a vector form as:

$$y(k)=\bar{y}(k)\Phi(k) \quad (4)$$

where $\bar{y}=[y_1, y_2, \ldots, y_M]$ is a known vector of suboutputs of the submodels in the model bank and $\Phi=[\phi_1, \phi_2, \ldots, \phi_M]^T$ is a unknown vector of the corresponding validity of the submodels.

Accordingly, the estimation of the $\Phi$ can be cast (transformed) into a parameter estimation problem that can be described as:

$$\Phi(k+1)=\Phi(k)+w(k) \quad (5)$$

$$y(k)=\bar{y}(k)\Phi(k)+v(k)$$

where $\Phi(k)$ is the vector of the unknown parameter (i.e., weights or validity) to be estimated, and v(k) can be a measurement noise and a model mismatched noise with a covariance R, if v(k) follows a white Gaussian distribution. w(k) can be an artificial noise with a covariance Q. The artificial noise w(k) can be added to $\Phi(k+1)$ to serve as time-varying parameters and avoid ill-conditioned numerical computation.

Furthermore, the equality and inequality constraints of the convexity of ($\Phi$) that are described in Equations (2) and (3) respectively can be added to the parameter estimation problem that are described in Equation (5). Accordingly, a full description of the parameter estimation problem can be:

$$\Phi(k+1)=\Phi(k)+w(k)$$

$$y(k)=\bar{y}(k)\Phi(k)+v(k)$$

such that $$\beta\Phi(k)=1$$

$$0\leq\phi_i\leq 1 \quad (6)$$

where β is a row vector of [1, 1, . . . , 1, 1]. The parameter estimation problem is thus formulated as: in a given state equation in (6), minimize a minimum mean square error estimate of the state Φ(k).

$$\underset{\Phi}{\text{minimize}} \, \mathbb{E}[(\Phi(k) - \hat{\Phi}(k))^2] \tag{7}$$

such that $$\beta\Phi(k) = 1$$

$$0 \leq \phi_i \leq 1$$

where $\mathbb{E}$ is an expectation operator, β is a row vector of [1, 1, . . . , 1, 1], Φ is the vector of the unknown parameter (i.e., weights or validity) to be estimated, and $\hat{\Phi}$ is an estimation of Φ.

In order to solve the Equation (7) by using CKF to obtain $\hat{\Phi}$ that is the estimate of Φ, two steps can be applied.

In a first step, the equality constraint of the Φ that is described in Equation (2) can be solved by using the projection techniques (See D. Simon and L. C. Tien, "Kalman filtering with state equality constraints," *IEEE Transactions on Aerospace and Electronic Systems*, vol. 38, no. 1, pp. 128-136, 2002; and D. Simon, *Kalman filter generalizations*. John Wiley & Sons, Inc., 2006, pp. 183-227, each incorporated herein by reference in their entirety), where the unconstrained estimate (k) is projected onto the constraint space by minimizing $$\underset{\Phi}{\text{minimize}} \, \mathbb{E}\left[(\Phi(k) - \hat{\Phi}(k))^T W (\Phi(k) - \hat{\Phi}(k))\right] \tag{8}$$

such that $$\beta\Phi(k) = 1$$

where β is a row vector of [1, 1, . . . , 1, 1], and Φ(k) is [ϕ$_1$(k), ϕ$_2$(k), . . . , ϕ$_M$(k)]$^T$ and W is a positive define matrix.

A solution to Equation (8) can be obtained as:

$$\hat{\Phi}^*(k) = \hat{\Phi}(k) + K^*(k)[1 - \beta\hat{\Phi}(k)]$$

$$K^*(k) = W^{-1}\beta^T[R + \beta W^{-1}\beta^T]^{-1}$$

$$P^*(k) = [I - K^*(k)\beta]W^{-1} + Q \tag{9}$$

where $\hat{\Phi}$ an unconstrained estimate of Φ, $\hat{\Phi}^*(k)$ is the updated equality constrained estimate of Φ that satisfies Equation (2), W is a positive definite matrix weight, and I is the identity matrix.

The solution described in Equation (9) solves the unconstrained problem by obtaining the unconstrained estimate $\hat{\Phi}$ via a standard solution of Kalman filter firstly, and then using the unconstrained estimate to update the equality constrained estimate, which can be described in Equation (9).

The unconstrained estimate $\hat{\Phi}$ via the standard solution of Kalman filter can be obtained as follows:

Given the observations y(k), y(k−1), . . . , y(1) and the model outputs $\bar{y}$(k), $\bar{y}$(k−1), . . . , $\hat{y}$(1), the unconstrained estimate $\hat{\Phi}$ can be computed by using the standard Kalman filter solution as:

$$\hat{\Phi}(k) = \hat{\Phi}^-(k) + K(k)[y(k) - \bar{y}(k)\hat{\Phi}^-(k)] \tag{10}$$

where $$\hat{\Phi}^-(k) = \hat{\Phi}^{-1}(k-1),$$

$$P^-(k) = P^-(k-1) + Q(k-1),$$

$$K(k) = P^-(k)\bar{y}^T(k)[\bar{y}(k)P^-(k)\bar{y}^T(k) + R(k)]^{-1},$$

$$P(k) = [I - K(k)\bar{y}(k)]P^-(k), \text{ and}$$

$$\bar{y} = [y_1, y_2, \ldots, y_M].$$

In a second step of the, truncation and normalization (See N. L. Nihan and G. A. Davis, "Recursive estimation of origin-destination matrices from input/output counts," *Transportation Research Part B: Methodological*, vol. 21, no. 2, pp. 149-163, 1987, incorporated herein by reference in its entirety) can be adopted in order to meet the inequality constraints. The truncation is used to readjust each element of $\hat{\Phi}^*(k)$ in order not to violate the inequality constraint in Equation (7) as follows.

$$\hat{\phi}_i^{}(k) = 0, \text{ if } \hat{\phi}_i^{}(k) < 0 \tag{11}$$

Finally, $\hat{\phi}_i^{**}(k)$ is normalized since the truncation can violate the equality constraint in Equation (2) and to satisfies the other part of the inequality constraint.

$$\hat{\phi}_i^{*}(k) = \frac{\hat{\phi}_i^{}(k)}{\sum_{i=1}^{M} \hat{\phi}_i^{**}(k)} \tag{12}$$

$\hat{\phi}_i^{*}(k) = [\hat{\phi}_1^{*}(k), \ldots, \hat{\phi}_M^{***}(k)]^T$ is a final estimate of Φ, which is an estimated weights computation at time k.

It should be noted that in Equation (9), when W is set to be $P^{*-1}(k)$, a minimum variance estimate can be obtained, and when W=I, a least square estimate can be obtained (See D. Simon, "Kalman filtering with state constraints: a survey of linear and nonlinear algorithms," Control Theory Applications, IET, vol. 4, no. 8, pp. 1303-1318, 2010, incorporated herein by reference in its entirety).

In the present disclosure, experimental data are obtained based on a determination that W=I and W=$P^{*-1}(k)$ respectively.

FIG. 1 is a schematic diagram of an exemplary apparatus 100 for failure detection of a system. The apparatus 100 can include an interface group 100A and processing circuitry 100B. The interface group 100A can includes a plurality of sensors 102 that are configured to sense and collect operational data of the system. For example, the sensors can measure a temperature, a gas flow rate, a fluid flow rate, a fluid level, a pressure, a speed, or other operational data generated by the system. The interface group 100A also includes interface circuitry 104 that is configured to transmit signal between the interface group 100A and the processing circuitry 100B. For example, the interface circuitry 104 can transmit the operational data sensed by the sensors 102 to the processing circuitry 100B, and output an analysis data or a determination generated by the processing circuitry 100B to communication devices 106 of the interface group 100A.

The communication devices 106 can include a keyboard configured to receive an input message from an operator, a display screen configured to display the output signal transmitted from the processing circuitry, and a speaker configured to give an audio message generated by the processing circuitry.

The processing circuitry 100B can include an acquisition device 108 that is configured to acquire the operational data sensed by the sensors and transmit the operation data to an annotation device 110. The annotation device 110 is configured to analyze the operational data acquired by the acquisition device 108 from the sensors 102.

In an embodiment, the annotation device 110 can receive the operational data transmitted by the acquisition device 108, and create a bank of submodels based on the operational data. Further, the annotation device 110 can process the operational data to generate a validity profile of the submodels through the constrained Kalman Filter (CKF) based multimodel fault detection and diagnosis (FDD). The validity profile can be indicative of an operation state of the system at a given time, and the operation state includes a normal state and a fault state.

The processing circuitry 100B also includes a response device 112. The response device 112 can receive the analysis data transmitted by the annotation device 110, and make a response according to the analysis data. For example, the response device 112 can output, via the interface circuitry 104, the validity profile to the display screen of the communication devices 106. The response device 112 can also send an alarm signal to the speaker of the communication devices 106 when a failure mode is detected. The response device 112 can further send an operational command to a controller 116 to adjust operational parameters or conditions of the system. For example, the response device 112 can send a commend to shut down the system via the controller 116 when a safety-related failure is detected.

The processing circuitry 100B can include a memory 114. The memory 114 can be a magnetic disc, a semiconductor memory, or the like. The memory 114 can be an auxiliary storage device configured to store sensor data acquired by the sensors, programming software that is utilized by the annotation device 110, and analysis data output by the annotation device 110.

Figure 2:
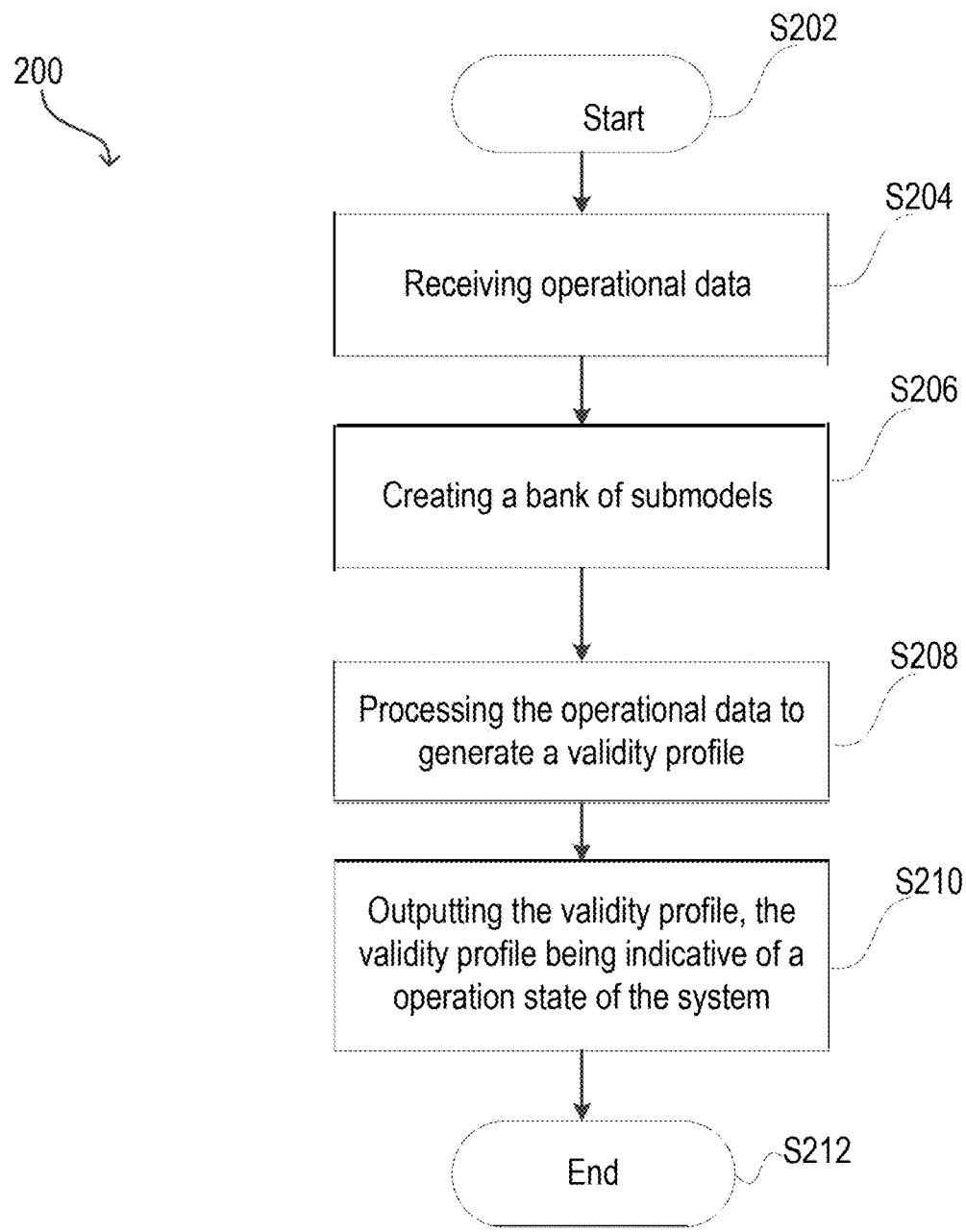
FIG. 2 is flowchart outlining an exemplary process for failure detection of a system, in accordance with some embodiments.

FIG. 2 is a flowchart outlining an exemplary process 200 for failure detection of a system, in accordance with some embodiments. The process 200 starts from step S204, where operational data sensed by the sensors from a plurality of components of the system is received by the acquisition device. The acquisition device further sends the operational data to the annotation device.

The process 200 then proceeds to step S206. At step S206, a bank of submodels can be created by the annotation device based on the operational data. The bank of submodels corresponds to a normal mode and a plurality of faulty modes of the system. The bank of submodels is valid in different operating regimes of the system, and each of the bank of submodels has a respective weight (validity) and a respective suboutput. An output of the system is a weighted sum of the suboutputs of the submodels.

In some embodiments, the operational data can be categorized through at least one of a K-means clustering and a C-means clustering to build the bank of submodels.

At step of S208, the annotation device can process the operational data to generate a validity profile through a constrained Kalman Filter (CKF) based multimodel fault detection and diagnosis (FDD). The annotation device can further send the analysis data to the response device.

At step of S210, the response device output, via the interface circuitry, the validity profile to the communication device. The validity profile is indicative of an operation state of the system at a given time, where the operation state includes a normal state and a fault state.

Figure 3:
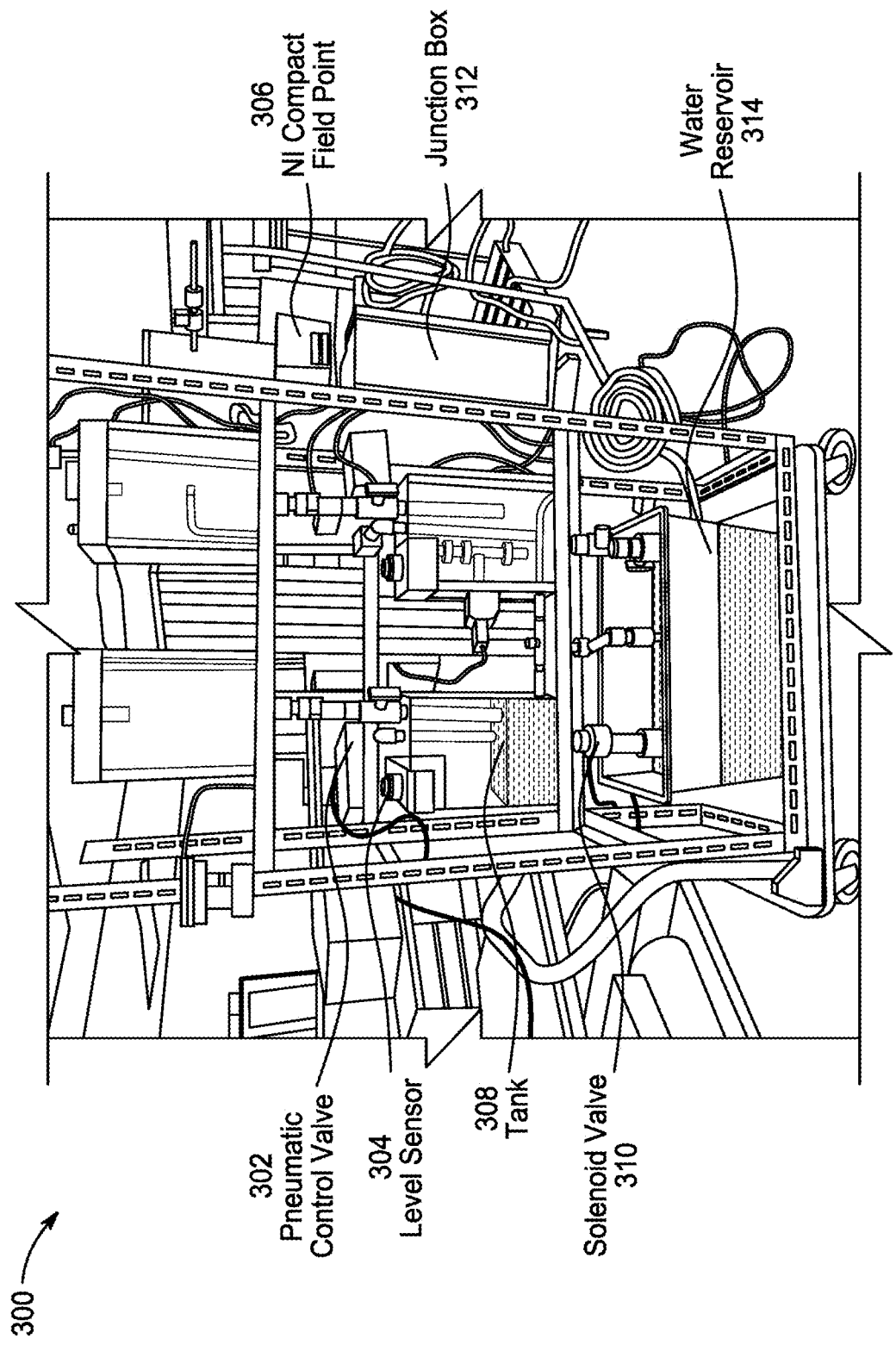
FIG. 3 is a schematic diagram of an experimental setup for failure detection of a tank system, in accordance with some embodiments.

FIG. 3 is a schematic diagram of an experimental setup for failure detection in a tank system 300, in accordance with some embodiments. In the disclosure, the proposed CKF based FDD can be evaluated on an experimental level control (LC) loop. In the tank system 300 provided in FIG. 3, the proposed method and apparatus mentioned above can be used to diagnosis stiction phenomenon in a level control loop valve of the tank system. Stiction is an undesirable effect in the control valve that causes the actual position of the control valve to deviate from the desired position. Stiction has shown to be a major factor in plant-wide oscillations and performance degradation in various control tasks as well as increased energy consumption. Thus, detection and isolation of stiction in control valves of the tank system 300 is an important task in order to allocate appropriate compensation technique for the control loop.

As shown in FIG. 3, the tank system 300 can have a tank 308 to contain water, an on/off outlet valve, such as a solenoid valve 310, to keep a constant flow and an inlet through a pneumatic control valve 302 to control the tank level. A water reservoir 314 is configured to keep water released from the tank 308. A level transmitter (sensor) 304 continuously measures the tank level and sends measurement signal to a proportional-integral (PI) controller 306 that is electrically coupled with a junction box 312, and programmed in National Instrument (NI) Compact field point processor via the LabVIEW software. A 4-20 mA output signal from the controller 306 actuates the pneumatic control valve 302 based on an electrical to pressure converter. A human machine interface (HMI) that contains the PI controller 306 and set point setting of the PI controller 306, and stiction model and associated parameters setting of the stiction model, etc. can be developed by using the LabVIEW software. The full tank height can be calibrated to be 30 cm and the set point for the experiment can be set at 15 cm.

Table 1 shows a stiction scenario (condition) of the experiment. In the experiment, two conditions are tested based the proposed method mentioned above.

TABLE I

Stiction scenario

| | Kano model parameters | |
| Scenario | S | J |
| --- | --- | --- |
| stiction type I | 25 | 5 |
| stiction type II | 60 | 10 |

To capture a dynamic behavior of the tank system 300 in different mode, a functional network (FN) model can be used. A training process of the FN model can be fast and have inbuilt model selection capability based on Minimum Description Length (MDL) criterion. The design procedure of the FN model can be refer to several published papers (See E.

Castillo, J. M. Gutierrez, A. S. Hadi, and B. Lacruz, "Some applications of functional networks in statistics and engineering," *Technometrics*, vol. 43, pp. 10-24, 2001; A. Adeniran, M. Elshafei, and G. Hamada, "Functional networks soft sensor for formation porosity and water saturation in oil wells," in *Presented at IEEE International Instrumentation and Measurement Conference, I2MTC*. Singapore: IEEE, May 2009, each incorporated herein by reference in their entirety).

Given the data $y_i, x_{i1}, x_{i2}, \ldots, x_{ik}$; $i=1, 2, \ldots, n$, the addictive FN model can be described as:

$$\hat{y} = \sum_{j=1}^{q_1} \alpha_{1j}\beta_{ij}(x_1) + \ldots + \sum_{j=1}^{q_k} \alpha_{kj}\beta_{kj}(x_k) + \varepsilon \quad (13)$$

where $\beta_{kj}$ is an individual element of the chosen basis function family, $q_k$ is an order of the basis function, $\alpha_{kj}$ is an coefficient of $\beta_{kj}$, and $\in$ is an error.

In the present disclosure, the experimental results corresponding to different stiction scenarios FDD are provided. Throughout the experiments, the state of the tank system 300 can be determined by taken the model with the maximum validity value at every instance of time. The experiments can be performed with four different scenarios. The scenarios that are considered are as follows:

Scenario I: stiction free process, when stiction is not acting on the pneumatic value (pneumatic control valve).

Scenario II: stiction type II is acting on the pneumatic value (pneumatic control valve).

Figure 4A:
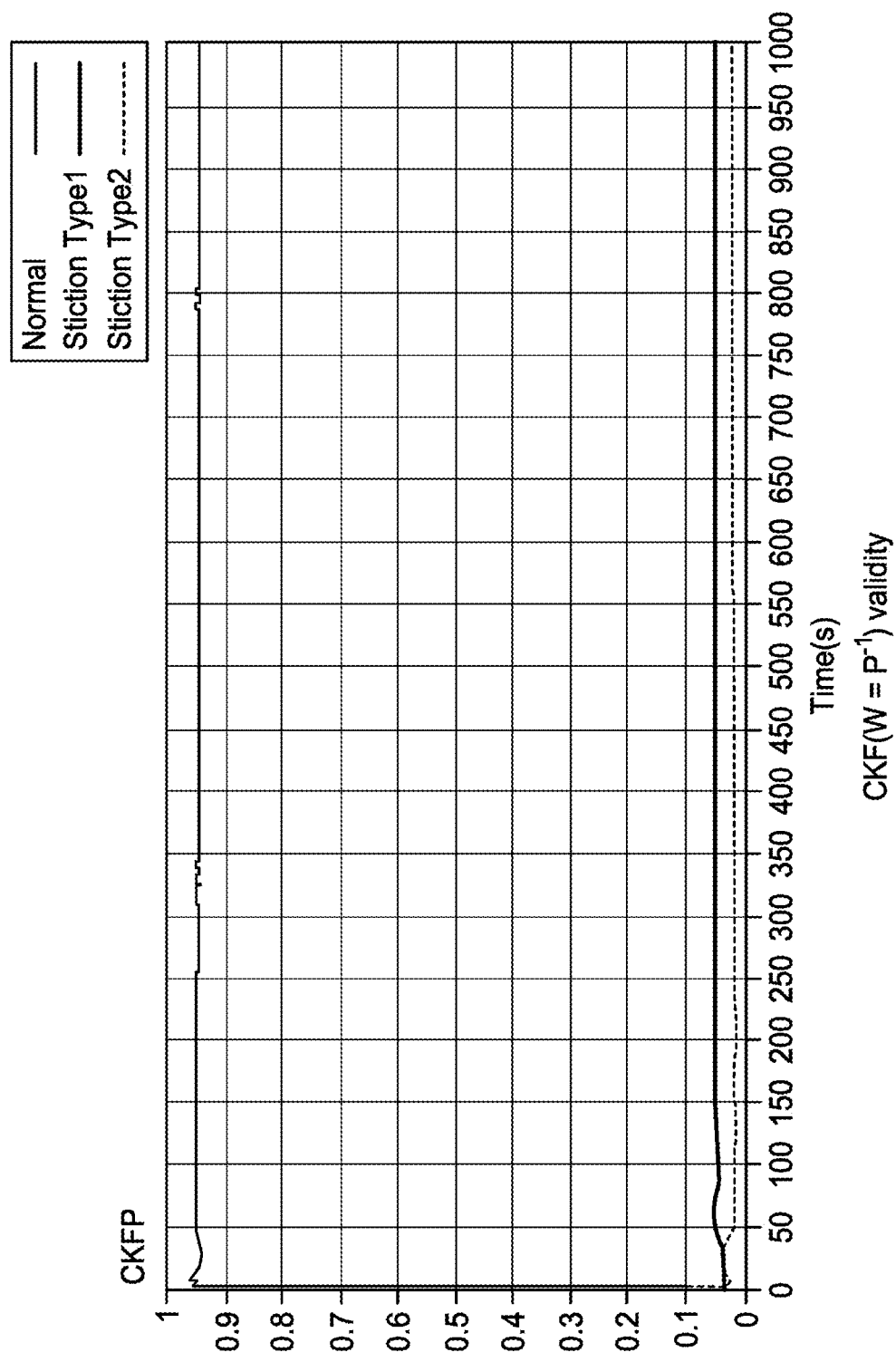
FIG. 4A is a first experimental result when the tank system is operated in a normal mode.
Figure 4B:
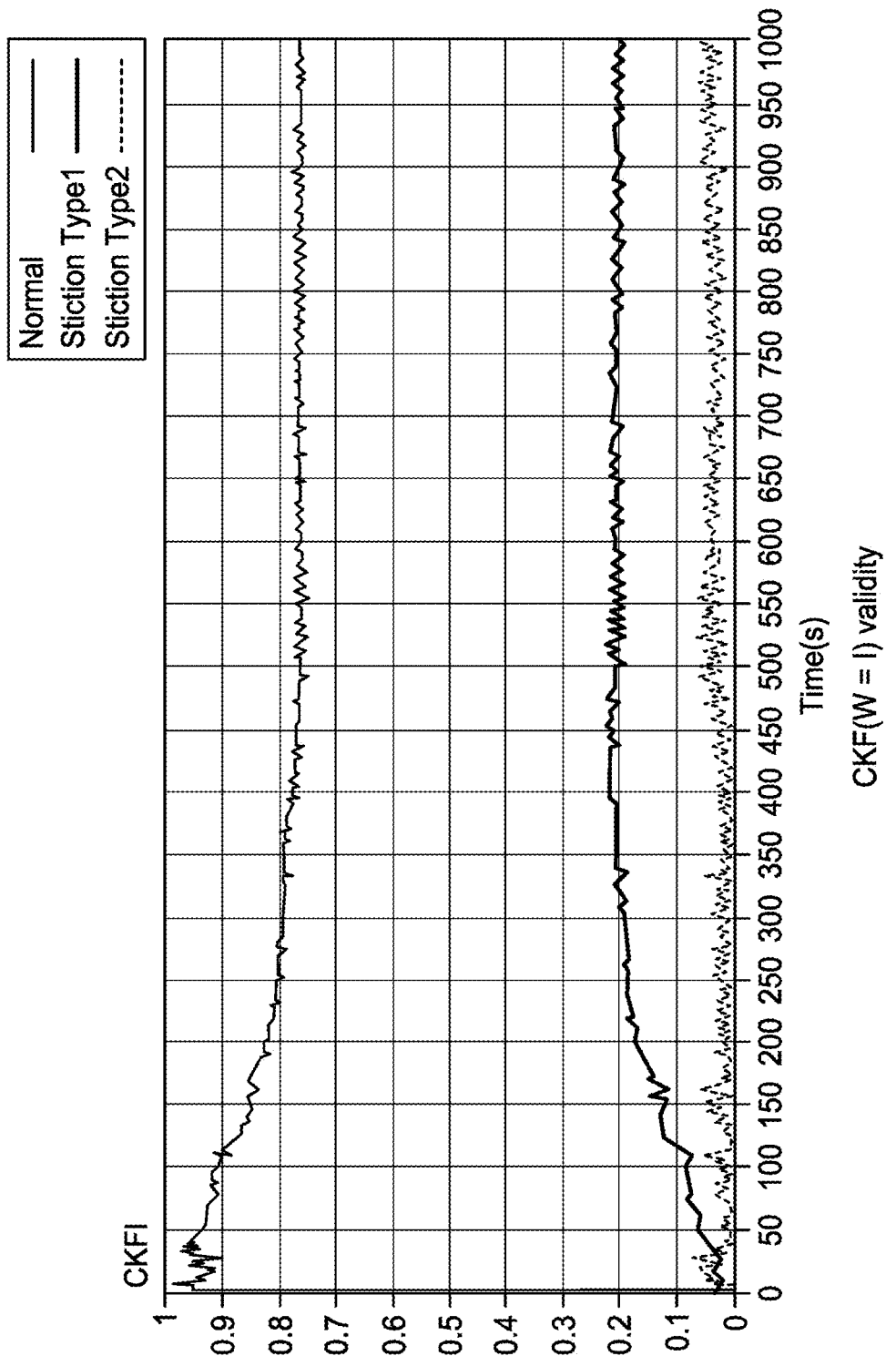
FIG. 4B is a second experimental result when the tank system is operated in a normal mode.

FIGS. 4 and 5 illustrate experiment results obtained from the scenario I. In scenario I, the tank system 300 can be operated in a normal mode without any stiction injected. The model bank (identified models) can be defined and run online along the operation of the tank system 300 that is mentioned in FIG. 3. Validity of the models can be estimated by the CKF supervisor (CKF FDD) to determine the state of the system. The estimated validity profiles are shown in FIGS. 4A and 4B. In FIG. 4A, the positive defined matrix weight w is set to be $P^{-1}$ which corresponds to a minimum variance estimate. In FIG. 4B, the positive defined matrix weight w is set to be I, which gives a least square estimate.

Figure 5A:
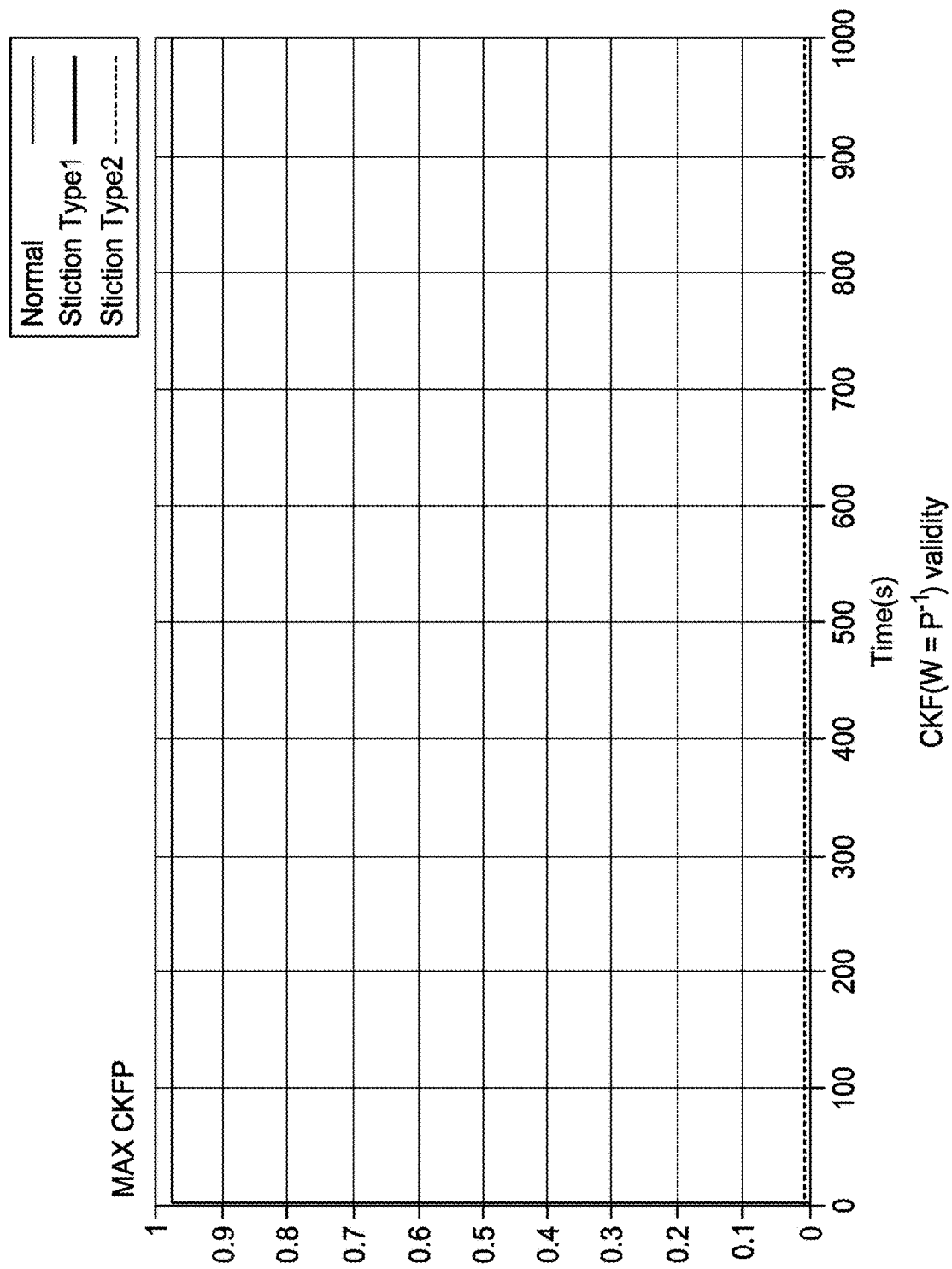
FIG. 5A is a third experiment result when the tank system is operated in a norm al mode.
Figure 5B:
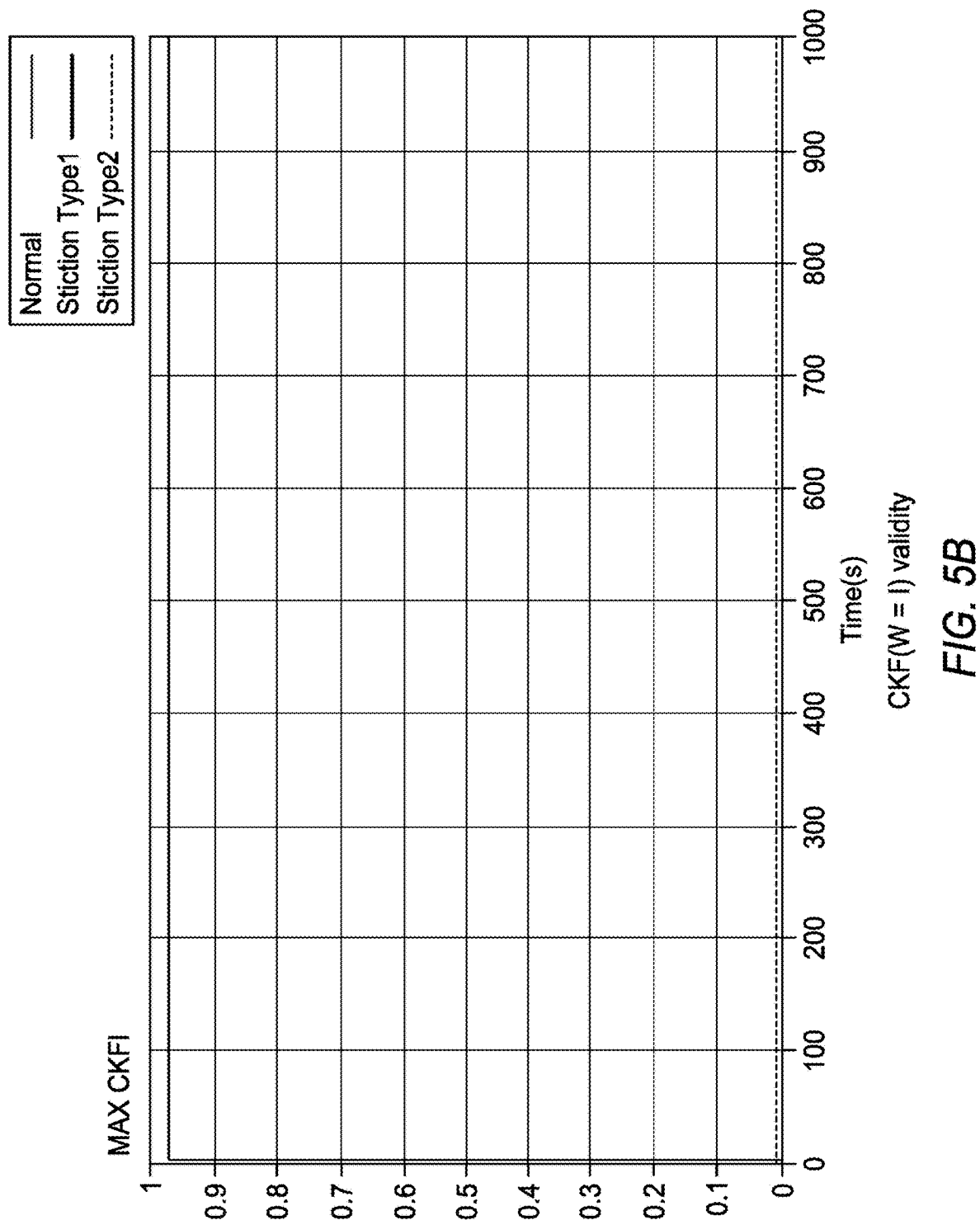
FIG. 5B is a fourth experiment result when the tank system is operated in a normal mode.

It can be observed from FIGS. 4A and 4B that the proposed method can detect the operation of the tank system 300 in the normal mode, where the normal mode is depicted by a highest validity. It can also be noted that small fluctuation in the validity profiles can be observed. The fluctuation of the validity profiles is driven by an oscillation of the water level in the tank system 300 because the water is rarely settled. FIGS. 5A and 5B provide a maximum value of the validity that can determine the state of the tank system 300.

Figure 6A:
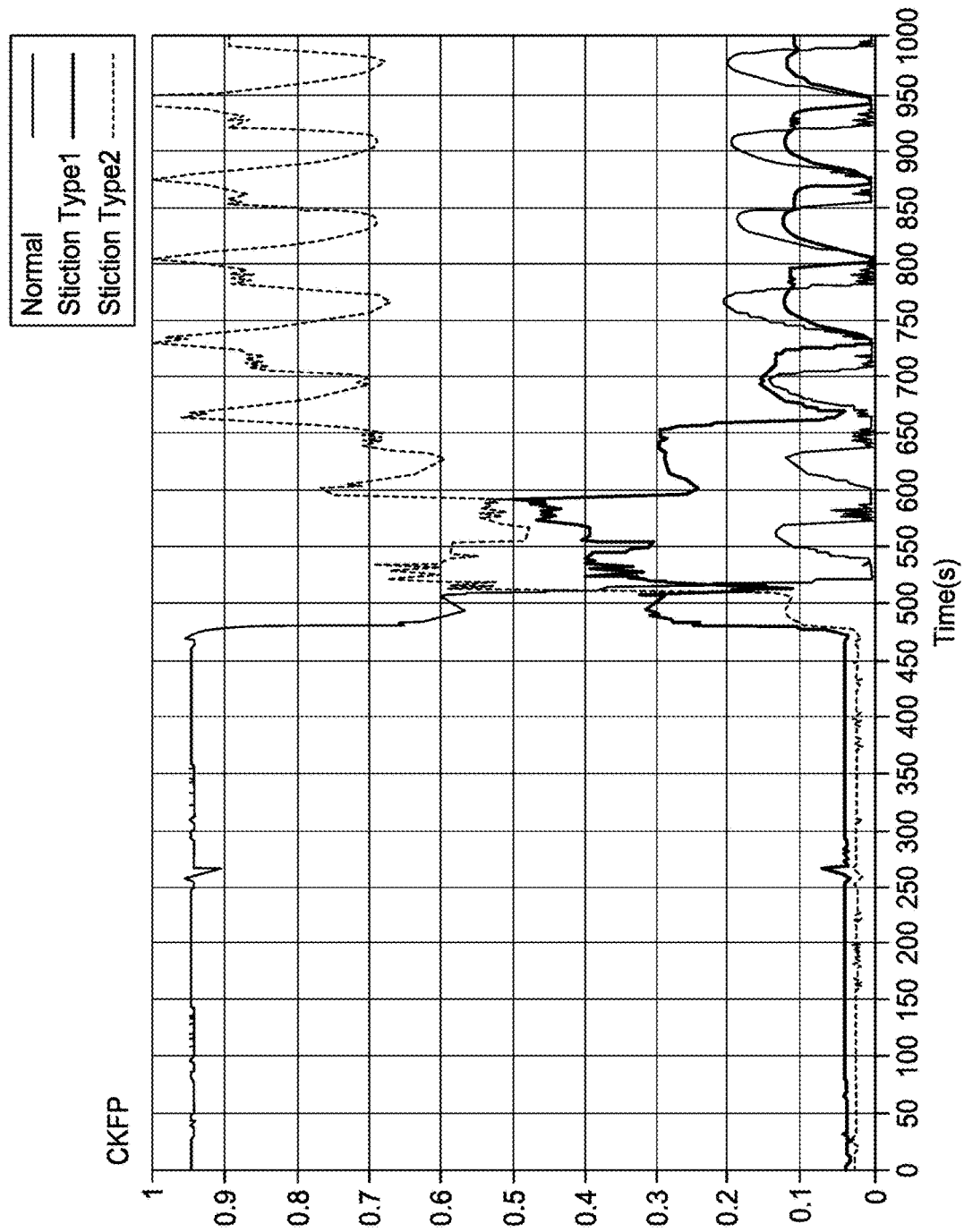
FIG. 6A is a first experimental result when the tank system is operated in a normal mode and a followed fault mode.
Figure 6B:
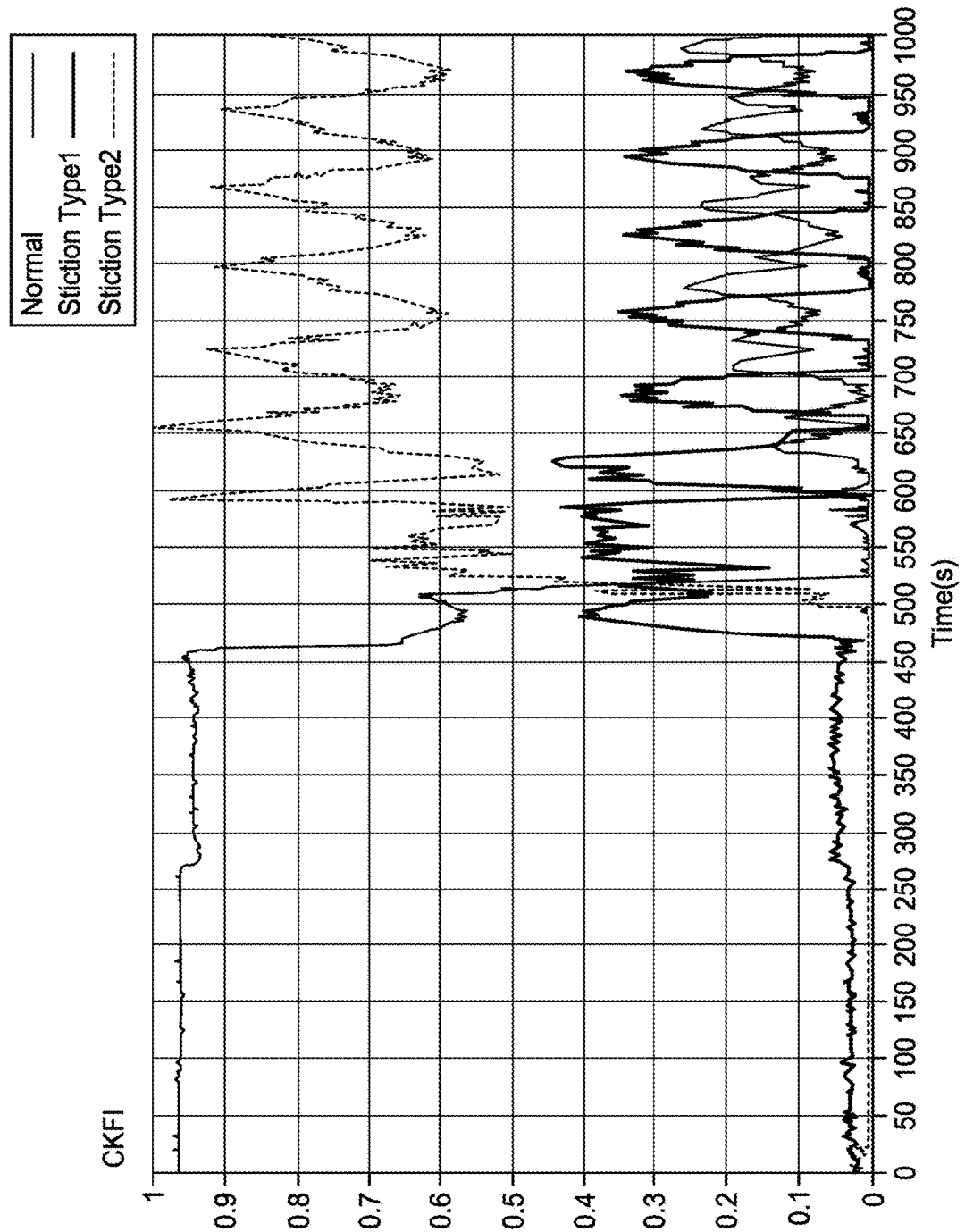
FIG. 6B is a second experimental result when the tank system is operated in a normal mode and a followed fault mode.
Figure 7A:
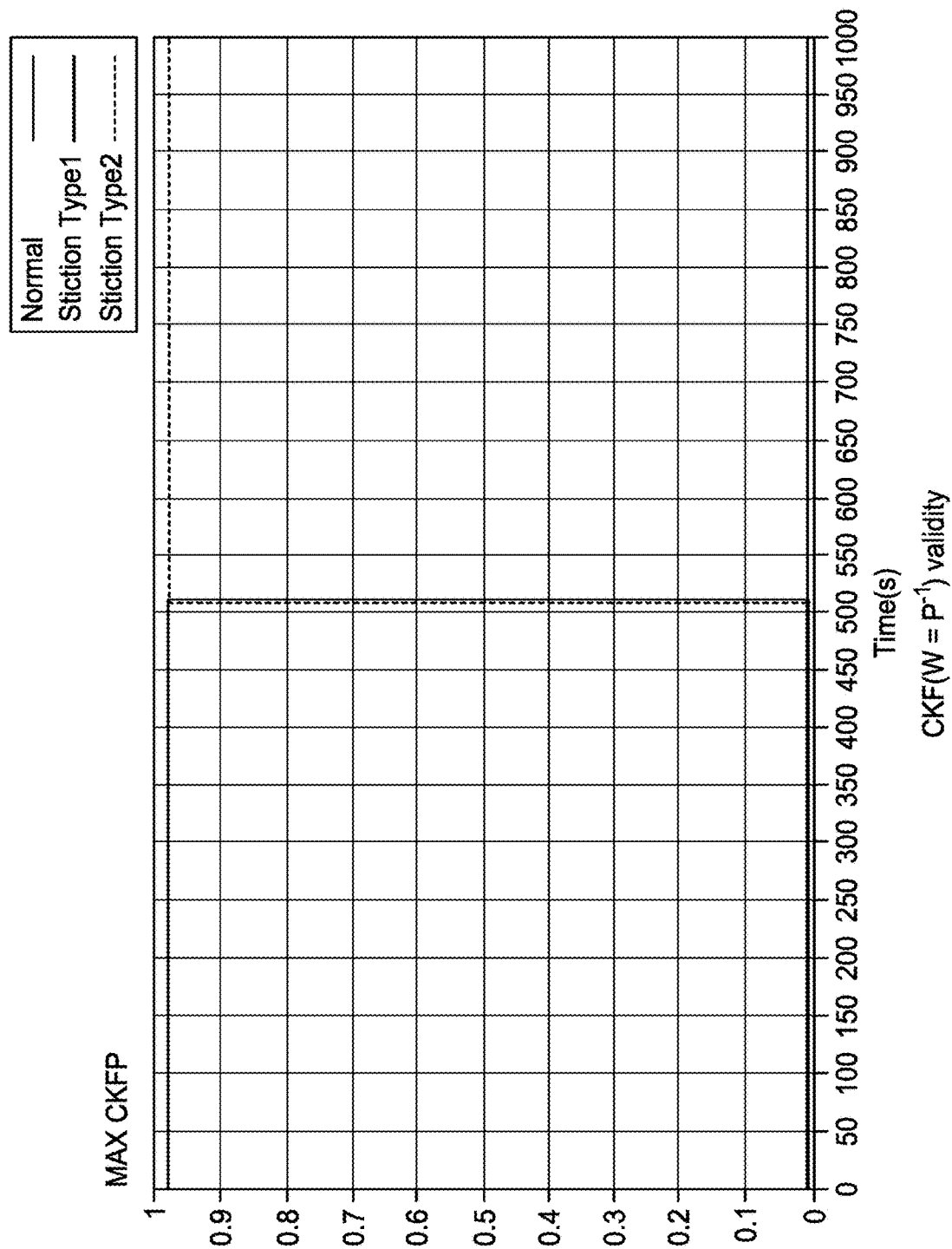
FIG. 7A is a third experiment result when the tank system is operated in a normal mode and a followed fault mode.
Figure 7B:
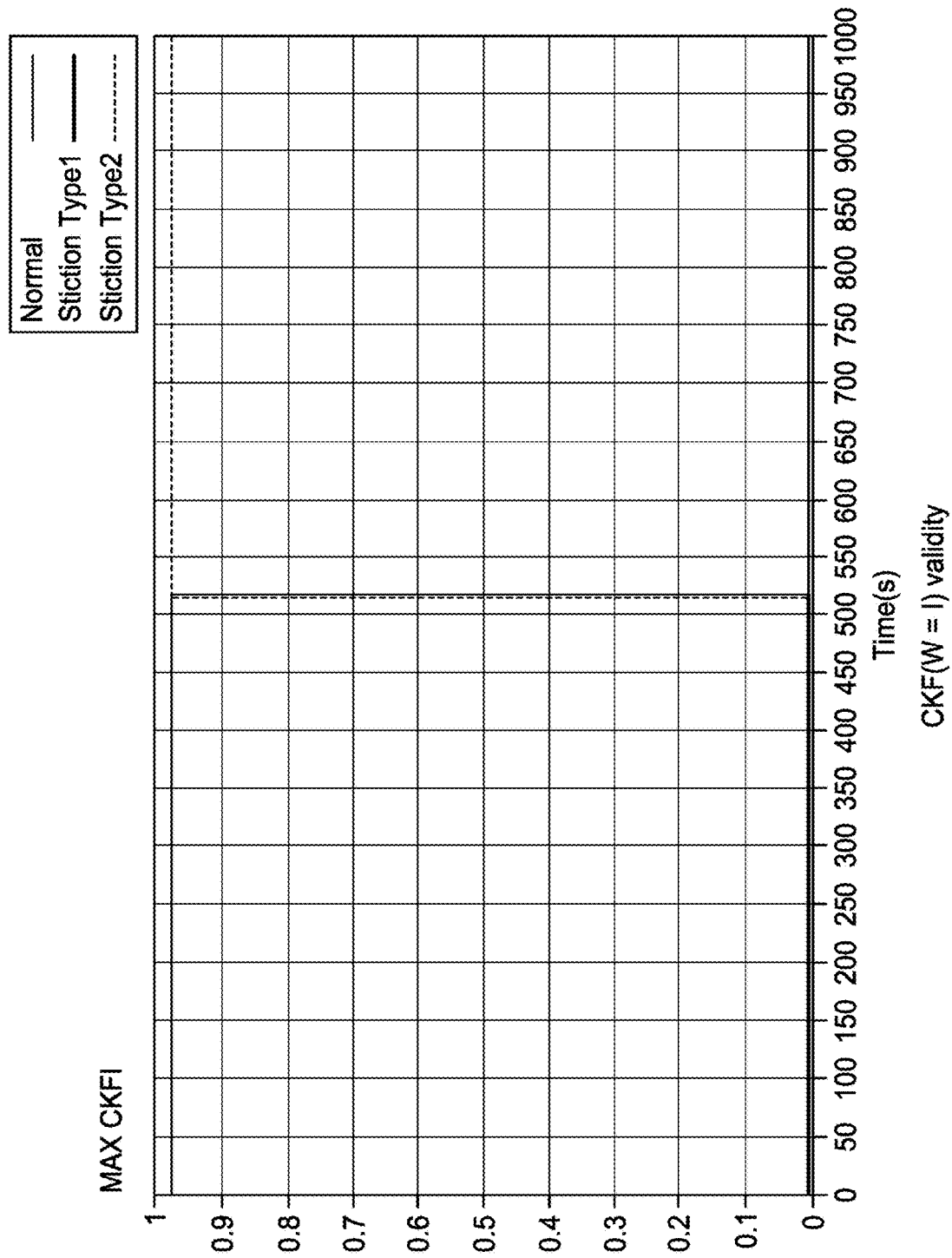
FIG. 7B is a fourth experiment result when the tank system is operated in a normal mode and a followed fault mode.

FIGS. 6 and 7 illustrate experiment results obtained from the scenario II. In scenario II, the tank system 300 can be operated in a normal condition for certain some time and then a type II stiction can be injected at a time instant of 490 seconds. The raw validity profile of the CKF supervisor can be shown in FIGS. 6A and 6B while the maximum validity profile that shows the isolation time of the failure can be shown in FIGS. 7A and 7B. It can be observed from FIGS. 6A and 6B that type II stiction can be detected by the instantaneous declination of the normal model validity and the rise of the type II stiction model validity. An oscillation can also be observed after the stiction is injected as noticed in the validity profile. The oscillation is driven by the wavy nature of the water level, caused by the stiction, which can result in unpredictable measurement of the level sensor. Although the oscillation can bring measurement difficulty, the proposed CKF supervisor (CKF based FDD) can be robust enough to handle such a noisy situation, as evident from the present simulation. An isolation time for both the CKF weight settings of $W=P^{-1}$ and $W=I$ can be seen at 510 seconds in FIGS. 7A and 7B.

Table II provides performance results of different models applied in the disclosed experiments.

TABLE II

Performance Results of Different Models

| Model | Training | | Validation | |
|---|---|---|---|---|
| | RMSE | CC | RMSE | CC |
| Model 1 (normal) | 0.0214 | 0.9813 | 0.0203 | 0.8637 |
| Model 2 (type I) | 0.1775 | 0.9930 | 0.1681 | 0.9940 |
| Model 3 (type II) | 0.3203 | 0.9952 | 0.2847 | 0.9961 |

In the present disclosure, a constrained Kalman filter (CKF) based multimodel FDD approach for failure detection in a nonlinear systems is proposed. The disclosed method consists of a bank of models corresponding to the fault-free and faulty modes of the system and a CKF supervisor. The method is independent of the type of model used, and hence analytical models, data-driven models or combination of both can be used to generate a bank of models. In the absence of analytical models of the diagnosed system, a function network (FN) data-driven model can be proposed. The structure of the proposed method is simple and considers noise and modeling uncertainty. The performance of the method in the presence of noise and model mismatch can be demonstrated in the detection and isolation of valve faults in a simulated three-tank system and a stiction phenomenon in a control valve of an experimental level control system.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A method for failure detection of a system, comprising:
   receiving, by processing circuitry of an apparatus, operational data from a plurality of components in the system;
   creating, by the processing circuitry, a bank of submodels based on the operational data, the bank of submodels corresponding to a normal mode and one or more faulty modes of the system and being valid in different operating regimes of the system, each of the bank of submodels has a respective weight (validity) and a respective suboutput, an output of the system being a weighted sum of the suboutputs of the submodels;
   processing, by the processing circuitry, the operational data, by the processing circuitry, to generate a validity profile through a constrained Kalman Filter (CKF) based multimodel fault detection and diagnosis (FDD); and
   outputting, by interface circuitry of the apparatus, the validity profile, the validity profile being indicative of an operation state of the system at a given time, the operation state including a normal state and a fault state,
   capturing a failure of the system based on a prediction of the validity;
   estimating a residual life of the system based on the prediction of the validity; and estimating a next failure time based on the prediction of the validity;

wherein the bank of submodels comprises:

a plurality of submodels $\mathcal{M}_i$, where i=1, 2, ... M, $\mathcal{M}_1$ corresponding to the normal mode, $\mathcal{M}_2$ to $\mathcal{M}_M$ corresponding to the faulty modes of the system; and a plurality of suboutputs $y_i$, where $y_i$ is an output of the submodel $\mathcal{M}_i$, i=1, 2, ... M, where the output y(k) of the system is equal to $\Sigma_{i=1}^M y_i(k)\phi_i(k)+v(k)$, v represents a modeling and measurement noise, k is a time moment, and $\phi_i$, i=1, 2, ... M is the weight or validity of the submodel $\mathcal{M}_i$; and wherein the validity $\phi_i$ of the submodel $\mathcal{M}_i$ further comprises:

an equality constraint that is $\Sigma_{i=1}^M \phi_i(k)=1$ ∀k; and an inequality constraint that is $0 \leq \phi_i \leq 1$ ∀k, ∀i∈1, ..., M.

2. The method of claim 1, wherein the bank of submodels comprises at least one of an analytical submodel, a data-driven submodel, and a function network (FN) data-driven model.

3. The method of claim 1, wherein the (CKF) based FDD further comprises:

solving, by the processing circuitry, the equality constraint of the validity Φ(k) via a projection technique to obtain a updated equality constrained estimate $\hat{\Phi}^*(k)$, the Φ(k) is a vector of the validity $\phi_i$ that is equal to $[\phi_1(k), \phi_2(k), \ldots, \phi_M(k)]^T$;

performing, by the processing circuitry, a truncation operation on the updated equality constrained estimate $\hat{\Phi}^*(k)$ to obtain a truncated estimate $\hat{\phi}_i^{}(k)$, where $\hat{\phi}_i^{}(k)=0$, if $\hat{\phi}_i^{}(k)<0$; and performing, by the processing circuitry, a normalization operation on the truncated estimate $\hat{\phi}_i^{}(k)$ to obtain a final estimate $\hat{\phi}_i^{*}(k)$, where $$\hat{\phi}_i^{*}(k) = \frac{\hat{\phi}_i^{}(k)}{\sum_{i=1}^M \hat{\phi}_i^{}(k)}.$$

4. The method of claim 3, wherein the solving further comprises:

projecting a unconstrained estimate $\hat{\Phi}(k)$ of the validity Φ(k) onto a constraint space by minimizing $$\underset{\Phi}{\text{minimize}}\ \mathbb{E}[(\Phi(k)-\hat{\Phi}(k))^T W(\Phi(k)-\hat{\Phi}(k))],$$

where βΦ(k)=1, β is a row vector of [1, 1, ..., 1, 1], Φ(k) is the vector of $[\phi_1(k), \phi_2(k), \ldots, \phi_M(k)]^T$, and W is a positive define matrix; and obtaining the updated equality constrained estimate $\hat{\Phi}^*(k)$ by solving $$\underset{\Phi}{\text{minimize}}\ \mathbb{E}[(\Phi(k)-\hat{\Phi}(k))^T W(\Phi(k)-\hat{\Phi}(k))].$$

5. The method of claim 4, wherein the $\hat{\Phi}^*(k)=\hat{\Phi}(k)+K^*(k)[1\beta\hat{\Phi}(k)]$, where $K^*(k)=W^{-1}\beta^T[R+\beta W^{-1}\beta^T]^{-1}$, $P^*(k)=[I-K^*(k)\beta]W^{-1}+Q$, R is a covariance of v(k), Q is a covariance of an artificial noise w(k) that is applied as $\hat{\Phi}(k+1)=\hat{\Phi}(k)+w(k)$.

6. The method of claim 4, wherein the unconstrained estimate $\hat{\Phi}(k)$ is obtained by using a standard Kalman filter solution so that $\hat{\Phi}(k)=\hat{\Phi}^-(k)+K(k)[y(k)-\bar{y}(k)\hat{\Phi}^-(k)]$, where $\hat{\Phi}^-(k)=\hat{\Phi}^{-1}(k-1)$, $P^-(k)=P^-(k-1)+Q(k-1)$, $K(k)=P^-(k)\bar{y}^T(k)[\bar{y}(k)P^-(k)\bar{y}^T(k)+R(k)]^{-1}$, $P(k)=[I-K(k)\bar{y}(k)]P^-(k)$, and $\bar{y}=[y_1, y_2, \ldots, y_M]$.

7. The method of claim 1, further comprising:

categorizing operational data through at least one of a K-means clustering and a C-means clustering to build the bank of submodels.

8. A failure detection apparatus, comprising:

processing circuitry configured to:

receive operational data from a plurality of components of the system;

create a bank of submodels based on the operational data, the bank of submodels corresponding to a normal mode and one or more faulty modes of the system and being valid in different operating regimes of the system, each of the bank of submodels has a respective weight (validity) and a respective suboutput, an output of the system being a weighted sum of the suboutputs of the submodels;

process the operational data, by the processing circuitry, to generate a validity profile through a constrained Kalman Filter (CKF) based multimodel fault detection and diagnosis (FDD); and interface circuitry configured to:

output the validity profile, the validity profile being indicative of a operation state of the system at a given time, the operation state including a normal state and a fault state, capturing a failure of the system based on a prediction of the validity;

estimating a residual life of the system based on the prediction of the validity; and estimating a next failure time based on the prediction of the validity;

wherein the bank of submodels comprises:

a plurality of submodels $\mathcal{M}_i$, where i=1, 2, ... M, $\mathcal{M}_1$ corresponding to the normal mode, $\mathcal{M}_2$ to $\mathcal{M}_M$ corresponding to the faulty modes of the system; and a plurality of suboutputs $y_i$, where $y_i$ is an output of the submodel $\mathcal{M}_i$, i=1, 2, ... M, where:

the output y(k) of the system is equal to $\Sigma_{i=1}^M y_i(k)\phi_i(k)+v(k)$, v represents a modeling and measurement noise, k is a time moment, and $\phi_i$, i=1, 2, ... M is the weight or validity of the submodel $\mathcal{M}_i$, wherein the validity of the submodel $\mathcal{M}_i$ further comprises:

an equality constraint that is $\Sigma_{i=1}^M \phi_i(k)=1$ ∀k; and an inequality constraint that is $0 \leq \phi_i \leq 1$ ∀k, ∀i∈1, ..., M.

9. The apparatus of claim 8, wherein the processing circuitry is configured to:

solve the equality constraint of the validity $\Phi(k)$ via a projection technique to obtain a updated equality constrained estimate $\hat{\Phi}^*(k)$, the $\Phi(k)$ is a vector of the validity $\phi_i$ that is equal to $[\phi_1(k), \phi_2(k), \ldots, \phi_M(k)]^T$;

perform a truncation operation on the updated equality constrained estimate $\hat{\Phi}^*(k)$ to obtain a truncated estimate $\hat{\phi}_i^{}(k)$, where $\hat{\phi}_i^{}(k)=0$, if $\hat{\phi}_i^{}(k)<0$; and perform a normalization operation on the truncated estimate $\hat{\phi}_i^{}(k)$ to obtain a final estimate $\hat{\phi}_i^{*}(k)$, where $$\hat{\phi}_i^{*}(k) = \frac{\hat{\phi}_i^{}(k)}{\sum_{i=1}^{M} \hat{\phi}_i^{}(k)}.$$

10. The apparatus of claim 9, wherein the processing circuitry is configured to:

project a unconstrained estimate $\hat{\Phi}(k)$ of the validity $\Phi(k)$ onto a constraint space by minimizing $$\underset{\Phi}{\text{minimize}} \; \mathbb{E}[(\Phi(k) - \hat{\Phi}(k))^T W (\Phi(k) - \hat{\Phi}(k))],$$

where $\beta\Phi(k)=1$, $\beta$ is a row vector of $[1, 1, \ldots, 1, 1]$, and $\Phi(k)$ is the vector of $[\phi_1(k), \phi_2(k), \ldots, \phi_M(k)]^T$, and W is a positive define matrix; and obtain the updated equality constrained estimate $\hat{\Phi}^*(k)$ by solving $$\underset{\Phi}{\text{minimize}} \; \mathbb{E}[(\Phi(k) - \hat{\Phi}(k))^T W (\Phi(k) - \hat{\Phi}(k))].$$

11. The apparatus of claim 10, wherein the unconstrained estimate $\hat{\Phi}(k)$ is obtained by using a standard Kalman filter solution so that $\hat{\Phi}(k) = \hat{\Phi}^-(k) + K(k)[y(k) - \bar{y}(k)\hat{\Phi}^-(k)]$, where $\hat{\Phi}^-(k) = \hat{\Phi}^{-1}(k-1)$, $P^-(k) = P^-(k-1) + Q(k-1)$, $K(k) = P^-(k)\bar{y}^T(k)[\bar{y}(k)P^-(k)\bar{y}^T(k) + R(k)]^{-1}$, $P(k) = [I - K(k)\bar{y}(k)]P^-(k)$, and $\bar{y} = [y_1, y_2, \ldots, y_M]$.

* * * * *